Sept. 23, 1969  V. L. MAINES  3,469,057

FILTER SYSTEM FOR PARTICULATE MATTER

Filed Feb. 15, 1965

VIRGIL L. MAINES
INVENTOR

BY
ATTORNEYS

United States Patent Office 3,469,057
Patented Sept. 23, 1969

3,469,057
FILTER SYSTEM FOR PARTICULATE MATTER
Virgil L. Maines, Middletown, Ohio, assignor to Owens-Corning Fiberglas Corporation, a corporation of Delaware
Filed Feb. 15, 1965, Ser. No. 432,782
Int. Cl. B23k 9/16
U.S. Cl. 219—69                                                                                   2 Claims

ABSTRACT OF THE DISCLOSURE

An improved filtration system for use with lubricating and/or cooling oils, which utilizes a plurality of sizes of diatomaceous earth filter aids, and which is particularly suitable for use in purifying dielectric fluids used in electrical discharge machining. An essential element of the system is a filter comprising a plurality of perforate hollow screens coated by the mixed grades of diatomaceous earth.

---

Figure 1:
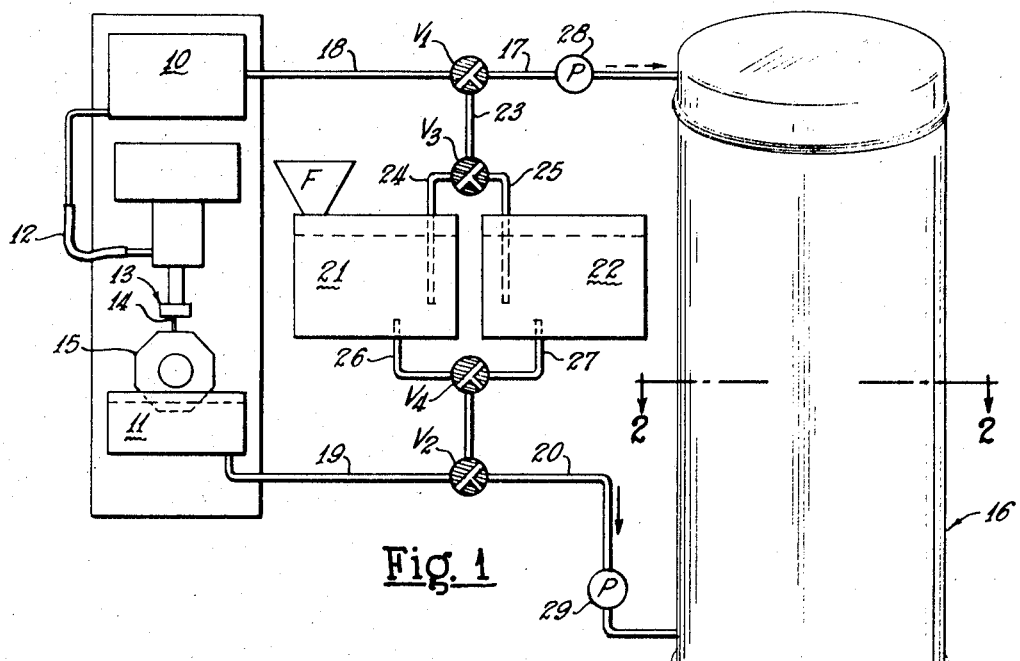

This invention relates to an improved filtration system for use with lubricating and/or cooling oils, and, more specifically, this invention relates to an improved filter which uses a plurality of types of diatomaceous earth filter aids and is specifically adapted for use in filtering dielectric fluids used in electrical discharge machine apparatuses as will be described in detail below.

Electrical discharge machining[1] (EDM), in which a high frequency spark discharge from a soft metal tool or probe disintegrates hard metals, requires relatively large amounts of dielectric fluids, such as silicon oils, to cool the area of spark discharge and to remove the carbon and metallic particles formed by the disintegration of the portions of the workpiece subject to the spark discharge. In EDM drilling installations in which the electrode is a fine tubular element through which fluid is supplied to the area of spark discharge, it is extremely important that the fluid be substantially free from solid impurities in order that the passageway within the tubular electrode does not become plugged. If the passageway becomes plugged, the loss of cooling and cleaning fluid will quickly cause an electrode failure, necessitating replacement, costly down time, and possible damage to the workpiece.

Because of the relatively high cost of dielectric fluids, it is desirable that such fluids be reclaimed by filtering and recirculated for repeated use with the EDM apparatus. Filtering or otherwise purifying such fluids to the necessary degree of clarity required for certain EDM installations has been extremely difficult for several reasons. First, the particulate impurities formed in the metal removal process may vary greatly in size. It has been found that the drilling or machining of certain metals will produce metallic particles as small as .7 micron and carbon particles as large as 10 microns. Filtration systems capable of removing the smallest metallic particles have been found incapable, when used alone, of satisfactorily filtering the dielectric fluid used in EDM processes due to the fact that the larger particles will clog or coat the matrix of the filter, thus requiring frequent renewal or cleaning of the filter element or requiring a series of filter elements of gradually increasing efficiency to properly clarify the dielectric fluid. Secondly, the flow rate of such filters is very low and becomes progressively lower as the larger particles coat the surfaces of the filter.

While filters using commercially available diatomaceous earth have been used in connection with EDM installations, the aforementioned problems have limited their efficiency in satisfactorily purifying the fluids, either due to the facts that they have been unable to remove the smallest particles from the fluid, that they require frequent backwash and renewal of the diatomaceous filter aid due to built-up impurities upon the external surface of the diatomaceous filter layer, or because their flow rates are very low.

It has been discovered that a single filter element which includes a filtering layer comprising diatomaceous earth bodies of greatly varying size is capable of overcoming the above disadvantages of prior art filter systems, and that such a filter reduces the frequency of necessary changes of the filter aids while maintaining the capability of clarifying dielectric fluids for use with the EDM machines to a much greater degree than was possible with prior art systems.

Accordingly it is an object of this invention to provide a filtering unit for use in purifying dielectric fluids used in EDM apparatuses which is capable of removing particulate impurities of the size which will interfere with the operation of the apparatus.

It is another object of this invention to provide a single, compact filtering unit for dielectric fluids used in the EDM process which is capable of removing a very wide range of particulate impurity sizes from the dielectric fluids used therewith.

It is yet another object of this invention to provide a filter system which includes a diatomaceous filter earth aid comprising a wide range of diatomaceous earth particle sizes which form a filtering matrix capable of filtering a wide range of purity sizes from dielectric fluids used with EDM devices.

Figure 2:
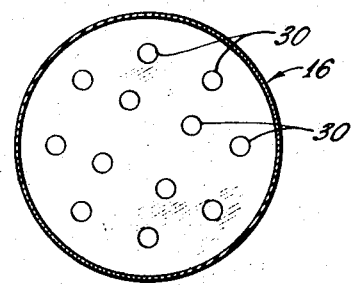
Figure 3:
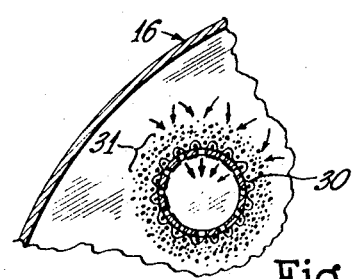

Other objects and advantages of the invention will be apparent from the following detailed description of a preferred embodiment thereof, reference being made to the accompanying drawings in which:

FIGURE 1 is a schematic drawing of a complete filter system associated with an EDM drilling machine and having a single filter cylinder which encloses a number of diatomaceous earth filter units;

FIGURE 2 is a cross-sectional view of the filter cylinder of FIGURE 1, taken along lines 2—2 thereof showing the position of the diatomaceous earth filter units; and FIGURE 3 is a partial cross section, on a greatly enlarged scale, showing one of the filter screens within the filter cylinder shown in FIGURES 1 and 2, and schematically showing a layer of the diatomaceous earth media and the flow path of the filtrate therethrough.

Referring to FIGURE 1, an electrical discharge machining device is schematically shown and includes a supply tank 10, a collector tank 11 with a flexible line 12, leading from the supply tank 10 to the movable drilling head 13. The drilling head 13 holds an electrode 14 through which the clean fluid flows to the area of spark discharge, as previously explained. A workpiece 15 is shown partially immersed in the fluid within the collector tank 11.

The filter elements of the preferred embodiment described herein are housed within a cylindrical shell 16 which is connected at its upper end to the supply tank 10 by a line 17, a two-way valve V1 and a line 18. The lower end of the shell 16 is connected to the collector tank 11 of the EDM apparatus by a line 19, a two-way valve V2 and a line 20.

A filter backflush and coating system is connected between the valves V1 and V2 and includes a pair of clean fluid tanks 21 and 22. Valve V1 is connected by a line 23 to a two-way valve V3, which selectively will connect the line 23 to lines 24 and 25 which terminate in tanks 21 and 22 respectively. The tanks 21 and 22 empty, through lines 26 and 27, respectively, through a two-

---

[1] See Marks Mechanical Engineers Handbook, 6 ed., pp. 13–83.

way valve V4 and into the valve V2 between lines 19 and 20. A pump 28 in line 17 and a second pump 29 in the line 20 are provided to control the flow of dielectric fluid between the EDM machine, the filter shell 16, and the clean fluid tanks 21 and 22, as will be explained below.

Within the shell 16 are a number of perforate, tubular, fine mesh filter screens 30 which extend substantially lengthwise of the shell 16 and are shown in cross section in FIGURE 2. The filter screens are held within header members (not shown) such that the interior of the tubular filter screens 30 are in direct communication with the outlet at the top of the shell 16 and with the line 17. The header at the bottom of the shell is so designed that fluid entering the bottom of the shell through the line 20 is in direct communication with the exterior of the tubular filter screens 30. Thus, the passage of fluid from line 20 through the shell 16 and to the line 17 requires flow through the tubular filter screens 30 in a radially inward direction.

The tubular filter screens 30 serve as a base for a coating of diatomaceous earth filtering material which is schematically shown in FIGURE 3 and is designated by reference numeral 31. As previously explained, the earth coating 31 is comprised of a mixture of a plurality of grades of diatomaceous earth having a greatly variable particle size such that the matrix formed upon the tubular filter screens 30 is capable of filtering a wide range of particulate impurities from the fluid flowing radially inward therethrough to the interior of the filter screens 30.

While diatomaceous earths have been used in the prior art for filtering and reclaiming various types of oils, such as, in the process disclosed in U.S. Patent 1,393,223, these prior art processes are limited in their purification abilities due to the characteristics of commercially available diatomite. Diatomite, from which commercially available diatomaceous earth is prepared, is composed of fossil-like skeletons of microscopic water plants called diatoms having extremely fine porous frameworks of nearly pure silica. The physical characteristics of the diatoms, and therefore, the filtering characteristics of the earths prepared therefrom, will vary greatly depending upon the mineral deposit from which the diatoms have been mined. Thus, a given commercial grade of diatomaceous earth will have limited filtering characteristics which are dependent upon the size of the diatoms which may vary through a small range, and cannot be changed by crushing, further separating or breaking up the individual diatomaceous skeletons. Previous attempts to vary the filtering characteristics of a given grade of earth have been made by varying the concentration of the earth within the filtered liquid. However, it has been found that outstanding results may be obtained by intermixing, in selected portions, amounts of diatomaceous earths from several mineral sources so that the matrix formed thereby will have filtering characteristics which (1) are capable of filtering out extremely small particles, such as .7 micron, and (2) large particles over ten times the mean diameter of the small, without requiring the frequent changes of earth or backwash cycles to clear the matrix.

Accordingly, in one preferred embodiment of this invention, the diatomaceous earth coating 31 is comprised of equal amounts by volume of a very coarse grade of diatomaceous earth having a mean particle diameter of about 12 microns, such as that sold by the Johns-Mansville Company under the trademark "Hy-Flo Super-Cell" and a very fine diatomaceous earth having a mean particle diameter of about 5 microns such as that sold by the Johns-Manville Company under the trademark "Filter-Cel." It has further been found that an earth coating 31 which includes an equal amount of an intermediate grade of diatomaceous earth gives excellent filtering results throughout a wide range of particulate contaminant sizes and also will maintain a satisfactory flow rate.

As shown in FIGURE 1, the complete filter system includes means for backflushing the shell 16 to remove the earth coatings 31 from their filter screens 30 and means for recoating the filter screens 30 with a clean mixture of grades of diatomaceous earth. The operation of this system is described as follows.

When the system is performing its normal filtering function, valve V1 is turned to connect line 17 and 18 and valve V2 is turned to connect lines 19 and 20. Clean dielectric fluid is stored in the supply tank 10 and is supplied through the flexible line 12 to the electrode 14 in the drilling head 13. As the electrical discharge machining progresses, the fluid flowing through the electrode 14 removes the carbon and metallic particles from the sparking area and carries them in suspension into the collector tank 11. The collector tank 11 is drained through lines 19 and 20 by the pump 29 and enters the shell 16 where the contaminated fluid is in direct communication with the exterior of the filter screens 30, as previously explained. In this condition, the pump 29 operates to circulate the fluid as indicated by the solid arrow adjacent line 20 near the pump 29. The fluid flows through the earth coating 31, where it is clarified, and thence into the interior of the filter screen 30 and then back to the supply tank 10 through lines 17 and 18.

When the diatomaceous earth coatings 31 has reached its saturation point so that it no longer will maintain an acceptable flow rate or produce the desired degree of clarity in the filtered dielectric fluid, it is necessary to remove these contaminated coatings from the filter screens 30 and to replace it with coatings of clean earth. To remove the contaminated coatings 31, a backwash or flushing cycle is initiated as follows. The tank 22 contains a supply of clean dielectric fluid which is used for the backwash cycle. The clean fluid is supplied to the tank 22 through the line 17, valves V1 and V3 and line 25. To initiate the backwash cycle, valves V1 and V3 are turned so that the line 25 within the clean fluid tank 22 communicates through line 17, the pump 26, and into the top of the shell 16. With the pump 26 operating in the direction shown by the broken arrow adjacent line 17 near the pump 26, clean fluid from the tank 22 is forced through the header in the top of the shell 16 and radially outward through the tubular screens 30. This flow, which is opposite in direction to that shown by the arrows in FIGURE 3, will break the matrix of dirty diatomaceous earth coating 31 from the filter screens 30, causing it to be carried with the flow of fluid downwardly to the bottom of the shell 16. A flush valve V5 is opened to provide an escape for the contaminated fluid bearing the dirty diatomaceous earth coating 31. In this cycle, the valve V2 is closed so that the contaminated fluid cannot pass into line 19 or the valve V4. Upon completion of the backwash process, the interior of the shell 16 and the filter screens 30 are free of any dirty diatomaceous earth and are in condition to be recoated with a clean layer of earth 31. A short flushing with clean fluid from tank 22 through line 27, valves V4 and V2 and line 20 may be used to clear these lines of any backwashed impurities.

The coating cycle in the preferred embodiment shown in FIGURE 1 is initiated by turning valves V4 and V2 so that the line 26 leading from the clean fluid tank 21 is in communication with the line 20 connected to the bottom of the shell 16. The clean fluid within the tank 21, which is supplied through line 17, valves V1 and V3 and line 24, acts as a carrier for a mixture of the clean earths.

The plurality of grades of clean diatomaceous earth are inserted through the funnel F which extends into the cleaning fluid tank 21. With the tank 21 holding a supply of clean fluid, the desired amounts of various grades of earth are inserted into the tank 21 and mechanically mixed with the fluid therein. It has been found that mechanical agitation of the fluid within the tank 21 is satisfactory for uniformly dispersing the various grades within the fluid therein as they enter through the funnel F. A suitable mechanical agitator (not shown) may be permanently mounted within the tank 21 for this purpose.

The mixture of clean fluid and clean earths is applied to the outer surfaces of the filter screens 30 by positioning valves V4 and V2 to connect line 26 from the fluid tank 21 with line 20 leading to the bottom of the shell 16. With the pump 29 again circulating fluid through line 20 in the direction shown by the solid arrow, the clean earth-carrying fluid will pass radially inwardly through the filter screens 30 and the clean earth will be deposited thereon to form a filter cake or layer 31 upon the screens. When the screens have been coated with clean earth to the desired depth, the system is ready for initiation of the filtering cycle in which, as previously described, contaminated fluid from the collector tank 11 is pumped through lines 19 and 20 into the bottom of the shell 16.

It will be apparent to persons skilled in the art that the times required for proper backwashing and recoating may be varied depending upon the capacity of the system, the number of screens 30 to be coated, and the desired depth of the diatomaceous earth coating 31. In addition to this, the amounts of clean earth which are mixed in the clean fluid tank 31 prior to the coating cycle, will vary in accordance to the surface area of the screens to be coated, etc. The important concept illustrated in the preferred system described is the admixture of varying grades of diatomaceous earth to form a earth coating 31 which is capable of removing the smallest particulate impurity and yet will retain its flow characteristics and need not require excessively frequent backwashings. As previously stated, for use with filtering dielectric fluids from the collector tank of an EDM device, a mixture of equal parts, by volume, of the finest commercially available grade and the coarsest commercially available grade of diatomaceous earth has been found to be extremely satisfactory in both the filtering efficiency and flow rate characteristics. Use of an intermediate grade in equal parts by volume has also been found to be satisfactory.

Various modifications of the above described preferred embodiment of the invention will be apparent to those skilled in the art and it is to be understood that such modifications can be made without departing from the scope of the invention, if within the spirit and tenor of the accompanying claims.

1. A lubricating and cooling system for an electrical discharge machining apparatus, comprising, in combination, at least one electrode for electrical-discharge metal removal from a workpiece, means for supplying a dielectric fluid to said electrode in the area of electrical contact with such workpiece, means for collecting said fluid from said workpiece area, means for circulating said fluid from said collection means to a filter, said filter comprising an enclosed filter housing having a first opening at one end and a second opening at the other end, a plurality of elongate hollow filter screens extending through said housing, with one side of said screens in direct communication with said first opening and the other side of said screens in direct communication with said second opening, means for circulating said fluid through said second opening, radially through said screens to said first opening, said filter including a layer deposited on said other side of said screens comprising a homogeneous mixture of a first grade of diatomaceous earth having a relatively high porosity and flow rate and a mean particle diameter of about 12 microns, a second grade of diatomaceous earth having an intermediate porosity and flow rate, and a third grade of diatomaceous earth having a relatively low porosity and flow rate and a mean particle diameter of about 5 microns, means for circulating said fluid through said filter layer, and means for returning the filtered fluid to said electrode.

2. A method of filtering solid contaminates from contaminated dielectric fluids present in a lubricating and cooling system for an electrical discharge machining apparatus comprising in combination at least one electrode for electrical discharge metal removal from a workpiece, means for supplying a dielectric fluid to said electrode in the area of electrical contact with such workpiece, means for collecting said fluid from said workpiece area, means for circulating said fluid from said collection means to a filter, said filter comprising an enclosed filter housing having a first opening at one end and a second opening at the other end, a plurality of elongate hollow filter screens extending through said housing, with one side of said screens in direct communication with said first opening and the other side of said screens in direct communication with said second opening, said filter including a layer comprising a homogeneous mixture of a first grade of diatomaceous earth having a relatively high porosity and flow rate and a mean particle diameter of about 12 microns, a second grade of diatomaceous earth having an intermediate porosity and flow rate, and a third grade of diatomaceous earth having a relatively low porosity and flow rate and a mean particle diameter of about 5 microns, means for circulating said fluid through said filter layer, and means for returning the filtered fluid to said electrode, comprising the steps of (1) mixing a first grade of diatomaceous earth having a relatively high porosity and flow rate and a mean particle diameter of about 12 microns, a second grade of diatomaceous earth having an intermediate porosity and flow rate, and a third grade of diatomaceous earth having a relatively low porosity and flow rate and a mean particle diameter of about 5 microns in a substantially pure fluid, (2) passing said mixture of pure fluid and earth through said screens whereby said particles of earth are deposited as a layer on one side of said screens to form said filter, and (3) passing said contaminated fluid through said earth layer and said screens whereby said solid contaminants are deposited upon said layer and removed from said fluid which passes through said layer and said screens.

References Cited

UNITED STATES PATENTS

| 2,423,172 | 7/1947 | Booth | 210—193 X |
| 3,067,358 | 12/1962 | De Maine | 219—69 X |
| 3,158,532 | 11/1964 | Paul et al. | 210—503 X |

JOSEPH V. TRUHE, Primary Examiner

R. F. STAUBLY, Assistant Examiner

U.S. Cl. X.R.

210—75, 503